(12) United States Patent
Oshita

(10) Patent No.: US 7,924,507 B2
(45) Date of Patent: Apr. 12, 2011

(54) EYEPIECE LENS AND OPTICAL INSTRUMENT COMPRISING SAME

(75) Inventor: Koichi Oshita, Tokyo (JP)

(73) Assignee: Nikon Corporation, Tokyo (JP)

( * ) Notice: Subject to any disclaimer, the term of this patent is extended or adjusted under 35 U.S.C. 154(b) by 120 days.

(21) Appl. No.: 11/927,185

(22) Filed: Oct. 29, 2007

(65) Prior Publication Data

US 2008/0130127 A1    Jun. 5, 2008

Related U.S. Application Data

(60) Provisional application No. 60/953,574, filed on Aug. 2, 2007.

(30) Foreign Application Priority Data

Oct. 27, 2006   (JP) .................................. 2006-292702

(51) Int. Cl.
*G02B 25/00*   (2006.01)
(52) U.S. Cl. ...................................... 359/645; 359/643
(58) Field of Classification Search .................. 359/644, 359/645, 643
See application file for complete search history.

(56) References Cited

U.S. PATENT DOCUMENTS

| | | | | |
|---|---|---|---|---|
| 4,389,097 A | * | 6/1983 | Ohishi | ........................... 359/644 |
| 4,757,336 A | | 7/1988 | Nakayama et al. | |
| 5,880,881 A | * | 3/1999 | Ito et al. | .......................... 359/431 |
| 5,982,561 A | * | 11/1999 | Ishihara et al. | ............... 359/708 |
| 6,262,852 B1 | | 7/2001 | Takahashi | |
| 6,263,168 B1 | * | 7/2001 | Hasushita et al. | ............ 396/382 |
| 7,102,827 B2 | | 9/2006 | Ohshita | |
| 7,133,210 B2 | | 11/2006 | Mitsuki et al. | |
| 2003/0002150 A1 | | 1/2003 | Obama | |

FOREIGN PATENT DOCUMENTS

| | | |
|---|---|---|
| JP | 09-329752 A | 12/1997 |
| JP | 9-329752 A | 12/1997 |
| JP | 2000-098266 A | 4/2000 |
| JP | 2000-111810 A | 4/2000 |
| JP | 2000-171731 A | 6/2000 |
| JP | 2001-100115 A | 4/2001 |
| JP | 2004-258234 A | 9/2004 |

* cited by examiner

*Primary Examiner* — Jack Dinh
(74) *Attorney, Agent, or Firm* — Miles & Stockbridge P.C.

(57) ABSTRACT

A diopter-adjustable eyepiece lens EL, comprising first through third lenses L1 through L3, satisfies the condition $-0.9 < S1 < -0.3$, wherein first lens L1 shape factor S1 denotes a shape factor of the first lens L1, Re1 denotes the radius of curvature of a concave surface of the first lens L1 on an eyepoint EP side and Rs1 denotes the radius of curvature of a concave surface of the first lens L1 on the object side. The diopter adjustment satisfies also the condition $0.4 < d2/\Sigma d < 0.6$ wherein d2 denotes an air gap along the optical axis between the first lens L1 and the second lens L2 when diopter adjustment is carried out so that diopter becomes maximum on the negative side, and Ed denotes an air gap along the optical axis between a concave surface of the first lens L1 on the eyepoint side and a concave surface of the third lens L3 on the object side when diopter adjustment is carried out so that diopter becomes maximum on the negative side.

24 Claims, 13 Drawing Sheets

EYEPIECE LENS AND OPTICAL INSTRUMENT COMPRISING SAME

CROSS-REFERENCE TO RELATED APPLICATION

This application claims the benefit of U.S. Provisional Application No. 60/953,574 filed Aug. 2, 2007. This application also claims the priority of Japanese patent application No. 2006-292702 which is hereby incorporated by reference.

FIELD OF THE INVENTION

The present invention relates to an eyepiece lens used in a single-lens reflex camera or the like.

BACKGROUND OF THE INVENTION

The demand for diopter-adjustable single-lens reflex finders has grown steadily in recent years in the wake of the popularization of cameras (such as single-lens reflex cameras) for older age groups. To meet this demand, eyepiece lenses have been proposed that comprise a negative lens group, a positive lens group and a negative lens group arranged in this order, from an eyepoint side, along the optical axis, and in which diopter can be adjusted by moving the positive lens group (for instance, Japanese Unexamined Patent Application Laid-open Nos. H09-329752 and 2000-171731).

However, eyepiece lenses having such a constitution are problematic in that, for instance, the eyepiece lens of the optical system disclosed in Japanese Unexamined Patent Application Laid-open No. H09-329752 comprises 4 to 5 lenses, which drives up costs. The optical system disclosed in Japanese Unexamined Patent Application Laid-open No. 2000-171731 is also problematic, for instance, in having a short eye relief and low finder magnification.

SUMMARY OF THE INVENTION

In light of the above problems, it is an object of the present invention to provide a high-magnification diopter-adjustable eyepiece lens while securing long eye relief.

Another object of the present invention is to provide an optical instrument comprising such an eyepiece lens.

A further object of the invention is to provide a diopter adjustment method by this eyepiece lens.

The eyepiece lens according to the present invention is an eyepiece lens for observing an image formed by an objective lens via an erecting optical system, consisting of a first lens being a negative lens, a second lens being a positive lens, and a third lens being a negative lens, which are arranged in this order from an eyepoint side along the optical axis, in such a way that diopter adjustment can be carried out by moving at least one among the first lens, the second lens and the third lens along the optical axis, the first lens having a biconcave shape, and a concave surface of the third lens on the eyepoint side having a curvature greater than that of a concave surface of the third lens on the object side.

Preferably, the eyepiece lens satisfies the condition $0.4 < d2/\Sigma d < 0.6$ wherein d2 is an air gap along the optical axis between the first lens and the second lens when the diopter adjustment is carried out so that diopter becomes maximum on the negative side, and $\Sigma d$ is an air gap along the optical axis between a concave surface of the first lens on the eyepoint side and a concave surface of the third lens on the object side when the diopter adjustment is carried out so that diopter becomes maximum on the negative side.

In the eyepiece lens, preferably, a concave surface of the first lens on the eyepoint side has a greater curvature than a concave surface of the first lens on the object side.

Preferably, the eyepiece lens satisfies the condition $-0.9 < S1 < -0.3$ wherein S1 is a shape factor of the first lens and is defined by a conditional equation $S1 = (Re1 + Rs1)/(Re1 - Rs1)$ in which Re1 is the radius of curvature of a concave surface of the first lens on the eyepoint side and Rs1 is the radius of curvature of a concave surface of the first lens on the object side.

Preferably, the eyepiece lens satisfies the condition $-0.8 < S3 < -0.2$ wherein S3 is a shape factor of the third lens and is defined by a conditional equation $S3 = (Re3 + Rs3)/(Re3 - Rs3)$ in which Re3 is the radius of curvature of a concave surface of the third lens on the eyepoint side and Rs3 is the radius of curvature of a concave surface of the third lens on the object side.

In the second lens comprised by the eyepiece lens, preferably, a lens surface of the second lens on the eyepoint side and a lens surface of the second lens on the image side are aspherical surfaces, i.e. the second lens comprises a both-sides aspherical surface lens.

In the eyepiece lens, preferably, a convex surface of the second lens on the eyepoint side and a convex surface of the second lens on the image side are configured as aspherical surfaces having positive refractive power that decreases away from the optical axis, the eyepiece lens satisfying a condition:
$-1.0 < AS1/AS2 < -0.2$ wherein, AS1 is the amount of asphericity of a convex surface of the second lens on the eyepoint side and AS2 is the amount of asphericity of a convex surface of the second lens on the object side, and the height from the optical axis is $y = 0.3 \times re2$, where re2 is a paraxial radius of curvature of a convex surface of the second lens on the eyepoint side, the amount of asphericity AS of both convex surfaces of the second lens being given by a conditional equation $$AS = (y^2/r)/\{1+(1-K \times y^2/r^2)^{1/2}\} + C4 \times y^4 + C6 \times y^6 + C8 \times y^8 + C10 \times y^{10} - (y^2/r)/\{1+(1-y^2/r^2)^{1/2}\}$$

in which y is a height from the optical axis, r is a paraxial curvature radius, K is a conic constant, C4 is a fourth-order aspherical surface coefficient, C6 is a sixth-order aspherical surface coefficient, C8 is a eighth-order aspherical surface coefficient, and C10 is a tenth-order aspherical surface coefficient.

In the eyepiece lens, preferably, the first lens is a lens having an aspherical surface.

In the eyepiece lens, preferably, diopter adjustment can be carried out by moving the second lens, among the first lens, the second lens and the third lens, along the optical axis.

Preferably, the eyepiece lens satisfies the condition $0.3 < Rs1/Rs3 < 1.0$ wherein Rs1 is the radius of curvature of a concave surface of the first lens on the object side and Rs3 is the radius of curvature of a concave surface of the third lens on the object side.

Preferably, the eyepiece lens satisfies the condition $0.5 < f1/f3 < 0.8$ wherein f1 is a focal distance of the first lens and f3 is a focal distance of the third lens.

In the eyepiece lens, preferably, the erecting optical system comprises a mirror.

In the eyepiece lens, preferably, the erecting optical system comprises a pentamirror.

In the eyepiece lens, preferably, at least one among the first lens, the second lens and the third lens is a plastic lens.

In the eyepiece lens, preferably, the first lens, the second lens and the third lens are plastic lenses.

The optical instrument according to the invention of the present application is an optical instrument comprising an objective lens for forming an image of an object on a predetermined surface; and an eyepiece lens for observing an image formed by the objective lens via an erecting optical system, wherein the eyepiece lens is one of the above-described eyepiece lenses.

The diopter adjustment method according to the invention of the present application is a diopter adjustment method for an eyepiece lens for observing an image formed by an objective lens via an erecting optical system, the eyepiece lens consisting of a first lens being a negative lens, a second lens being a positive lens, and a third lens being a negative lens, which are arranged in this order from an eyepoint side along the optical axis, the first lens having a biconcave shape, and a concave surface of the third lens on the eyepoint side having a curvature greater than that of a concave surface of the third lens on the object side, wherein the diopter adjustment method for an eyepiece lens comprises a step of carrying out diopter adjustment by moving at least one among the first lens, the second lens and the third lens along the optical axis.

In the diopter adjustment method, preferably, the eyepiece lens further satisfying the condition $0.4<d2/\Sigma d<0.6$ wherein d2 is an air gap along the optical axis between the first and the second lens when the diopter adjustment is carried out so that diopter becomes maximum on the negative side, and $\Sigma d$ is an air gap along the optical axis between a concave surface of the first lens on the eyepoint side and a concave surface of the third lens on the object side when diopter adjustment is carried out so that diopter becomes maximum on the negative side.

In the diopter adjustment method, preferably, a concave surface of the first lens on the eyepoint side has a greater curvature than a concave surface of the first lens on the object side.

In the diopter adjustment method, preferably, the eyepiece lens further satisfying the condition $-0.9<S1<-0.3$ wherein S1 is a shape factor of the first lens and is defined by a conditional equation $S1=(Re1+Rs1)/(Re1-Rs1)$ in which Re1 is the radius of curvature of a concave surface of the first lens on the eyepoint side and Rs1 is the radius of curvature of a concave surface of the first lens on the object side.

In the diopter adjustment method, preferably, the second lens comprises a both-sides aspherical surface lens.

The invention provides thus a high-magnification diopter-adjustable eyepiece lens while securing long eye relief.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 13:
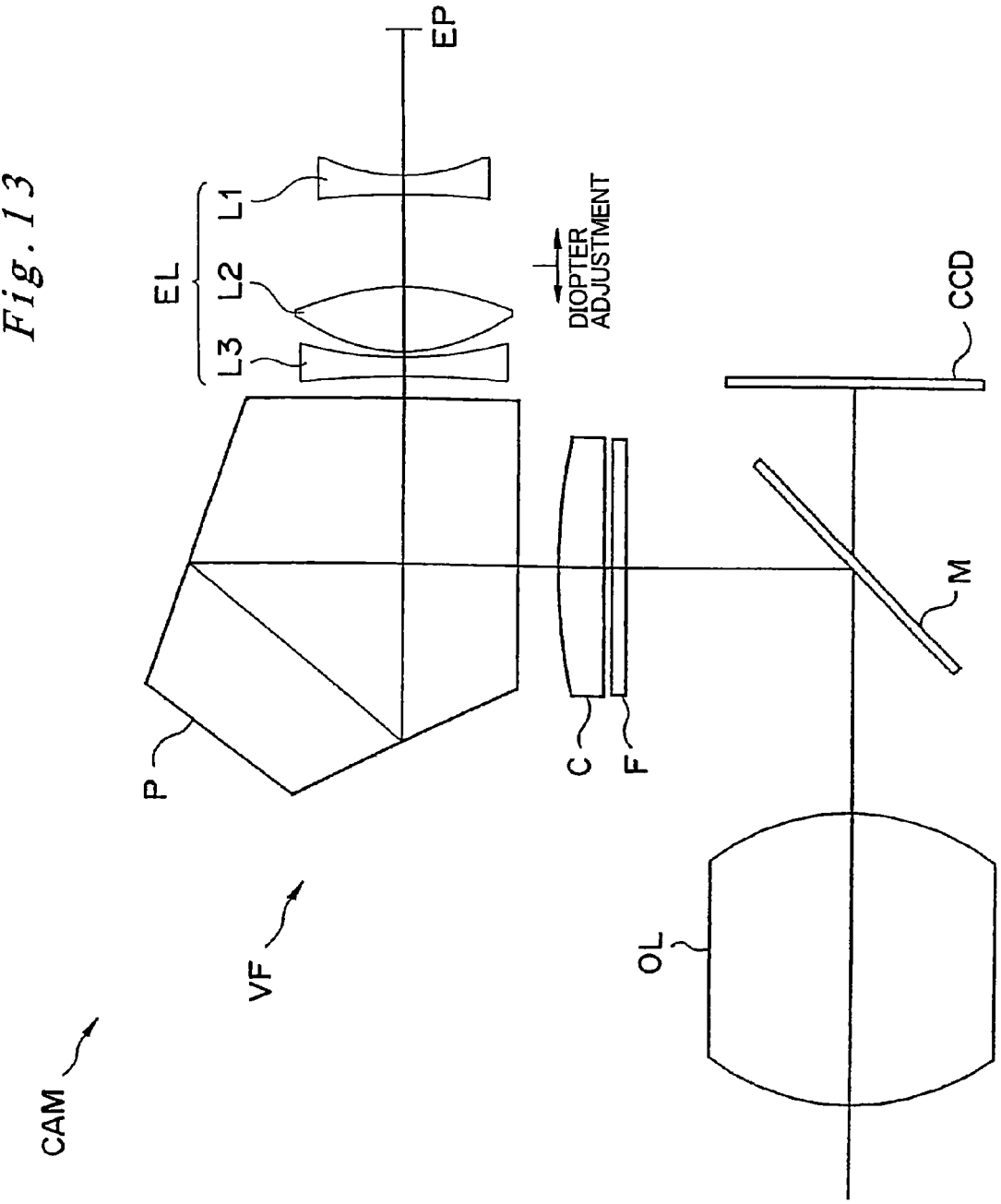
FIG. 13 is a schematic configuration diagram of a single-lens reflex camera.

Preferred embodiments of the present application are explained in detail next with reference to accompanying drawings. FIG. 13 illustrates a single-lens reflex camera CAM that comprises an eyepiece lens EL according to the invention of the present application. The single-lens reflex camera CAM comprises an objective lens OL, a mirror M, an imaging element CCD and a finder optical element VF. The finder optical element VF comprises in turn, sequentially from the object along the optical axis, a focus plate F, a condenser lens C, a pentaprism as an erecting optical system, and the eyepiece lens EL, such that an image formed on the focus plate F by the objective lens OL can be observed through the eyepiece lens EL. An eyepoint EP is provided behind the eyepiece lens EL.

The objective lens OL forms an image of an object on the imaging element CCD or on the focus plate F. The mirror M is inserted at an angle of 45 degrees relative to the optical axis that runs through the objective lens OL. Normally (during an imaging standby state), the light from the object (not shown) that passes through the objective lens OL is reflected by the mirror M and is focused on the focus plate F, while in a mirror-up state upon shutter release, the mirror M jerks upwards so that the light from the object (not shown) that passes through the objective lens OL is focused on the imaging element CCD. That is, the imaging element CCD and the focus plate F are arranged at optically conjugated positions.

The pentaprism P reverses up and down, left and right, the object image (inverted image) formed on the focus plate F by the objective lens OL, to erect thereby the image. The pentaprism P is constituted so as to allow the observer to observe an erected object image while affording a compact finder optical system VF. The condenser lens C, provided between the focus plate F and the pentaprism P, guides the object image on the focus plate F to the pentaprism P. Since the spread of a light beam increases as the latter moves away from the exit pupil of the objective lens OL, the condenser lens C, which has positive refractive power to curb dispersion of light beams, is arranged in the vicinity of the image formation position at which the object image is formed by the objective lens OL (for instance, arranged between the focus plate F and the pentaprism P, as in the present embodiment), with a view to preventing an increase in size of the erecting optical system and/or of the eyepiece optical system. A pentamirror having a hollow inner face may also be used herein instead of the pentaprism P. In that case, that portion should preferably be amenable to weight reduction.

The eyepiece lens EL comprises a first lens L1 being a negative lens, a second lens L2 being a positive lens and a third lens L3 being a negative lens arranged in this order, from an eyepoint EP side, along the optical axis in such a way that diopter can be adjusted by moving the second lens L2 along the optical axis. A concave surface of the first lens L1 on the eyepoint EP side has a larger curvature than a concave surface of the first lens L1 on the object side. A concave surface of the third lens L3 on the eyepoint EP side has a larger curvature than a concave surface of the third lens L3 on the object side. The eyepiece lens EL of the present embodiment satisfies the following conditional equations (1) and (2).

$$-0.9 < S1 < -0.3 \tag{1}$$

$$0.4 < d2/\Sigma d < 0.6 \tag{2}$$

In the equations, S1 denotes a shape factor of the first lens L1, and is defined by the conditional equation $S1=(Re1+Rs1)/(Re1-Rs1)$, in which Re1 denotes the radius of curvature of a concave surface of the first lens L1 on the eyepoint EP side, while Rs1 denotes the radius of curvature of a concave surface of the first lens L1 on the object side. When the concave surfaces of the first lens L1 on the eyepoint EP side and the object side are aspherical, the radii of curvature are calculated based on paraxial radii of curvature. The reference numeral d2 denotes an air gap along the optical axis between the first lens L1 (object side concave surface) and the second lens L2 (eyepoint EP side concave surface) when diopter adjustment is carried out so that diopter becomes maximum on the negative side, while $\Sigma d$ denotes an air gap along the optical axis between a concave surface of the first lens L1 on the eyepoint EP side and a concave surface of the third lens L3 on the object side when diopter adjustment is carried out so that diopter becomes maximum on the negative side.

Satisfying the conditions represented by the above conditional equations (1) and (2) allows achieving a high-magnification diopter-adjustable eyepiece lens while securing long eye relief. Conditional equation (1) stipulates the shape of the first lens L1 arranged closest to the eyepoint EP side. When the shape factor S1 of the first lens L1 drops below the lower limit of conditional equation (1), the radius of curvature of the surface of the first lens L1 on the eyepoint EP side becomes excessively large, thereby hampering correction of spherical aberration upon sustained high magnification. Conversely, when the shape factor S1 of the first lens L1 exceeds the upper limit of conditional equation (1), the radius of curvature of the surface of the first lens L1 on the object side becomes excessively large, thereby hampering astigmatism correction.

Conditional equation (2) stipulates the air gap along the optical axis between the first lens L1 and the second lens L2. Below the lower limit of conditional equation (2), the refractive power of the lenses becomes excessive, thereby hampering correction of coma aberration. When the upper limit of conditional equation (2) is exceeded, the effective diameter of the second lens L2 becomes excessive, which likewise hampers good correction of coma aberration.

In terms of good image field correction, the shape of the third lens L3 satisfies preferably the condition represented by conditional equation (3).

$$-0.8 < S3 < -0.2 \tag{3}$$

In the equation, S3 denotes the shape factor of the third lens L3, and is defined by the conditional equation $S3=(Re3+Rs3)/(Re3-Rs3)$, in which Re3 denotes the radius of curvature of the concave surface of the third lens L3 on the eyepoint EP side while Rs3 denotes the radius of curvature of the concave surface of the third lens L3 on the object side. When the concave surfaces of the third lens L3 on the eyepoint EP side and the object side are aspherical, the radii of curvature are calculated based on paraxial radii of curvature.

When the shape factor S3 of the third lens L3 exceeds the upper limit of conditional equation (3) the meridional image field becomes excessive on the negative side, as a result of which good image field correction cannot be achieved. On the other hand, when the shape factor S3 of the third lens L3 drops below the lower limit of the conditional equation (3) the meridional image field becomes excessive on the positive side, as a result of which, good image field correction cannot be achieved, either.

In order to achieve good coma aberration correction across a large pupil diameter, the convex surfaces of the second lens L2 on the eyepoint side and the object side are preferably configured as aspherical surfaces having positive refractive power that decreases away from the optical axis, these aspherical surfaces satisfying the condition represented by conditional equation (4).

$$-1.0 < AS1/AS2 < -0.2 \tag{4}$$

In the equation, AS1 denotes the amount of asphericity of a convex surface of the second lens L2 on the eyepoint EP side, while AS2 denotes the amount of asphericity of a convex surface of the second lens L2 on the object side. The amount of asphericity (aspherical surface equation) is explained below.

When the upper limit of conditional equation (4) is exceeded, the aspherical surface effect of the convex surface on the object side becomes excessive, which hampers achieving good coma aberration correction. Conversely, below the lower limit of conditional equation (4), the aspherical surface effect of the convex surface on the eyepoint EP side becomes excessive, which likewise hampers achieving good coma aberration correction.

As explained above, diopter adjustment is preferably carried out by moving the second lens L2 along the optical axis. Since the second lens L2 has a relatively high refractive index, doing so allows reducing astigmatism fluctuation caused by the movement of the lens during diopter adjustment.

In order to suppress image field fluctuations resulting from diopter adjustment, Rs1, which is the radius of curvature of a concave surface of the first lens L1 on the object side, and Rs3, which is the radius of curvature of a concave surface of the third lens L3 on the object side, satisfy preferably the condition represented by conditional equation (5):

$$0.3 < Rs1/Rs3 < 1.0 \tag{5}$$

If the condition represented by conditional equation (5) is not satisfied, the balance of curvature of field generated by the first lens L1 and the third lens L3 breaks down, which makes it difficult to suppress image field variations across the entire range of diopter adjustment.

To suppress astigmatism fluctuations resulting from diopter adjustment, a focal distance f1 of the first lens L1 and a focal distance f3 of the third lens L3 satisfy preferably the condition represented by conditional equation (6):

$$0.5 < f1/f3 < 0.8 \tag{6}$$

Conditional equation (6) prescribes a ratio between the focal distance f1 of the first lens L1 and the focal distance f3 of the third lens L3. When the upper limit of conditional equation (6) is exceeded, both the refractive power of the first lens L1 and the refractive power of the second lens L2 become excessive, which makes it difficult to suppress coma fluctuations across the entire range of diopter adjustment. Below the lower limit of conditional equation (6), conversely, the displacement of the second lens L2 becomes large relative to a predetermined diopter adjustment range, which makes it difficult to suppress spherical aberration fluctuations resulting from diopter adjustment, since astigmatism fluctuations are directly proportional to the amount of displacement of the second lens L2.

In a single-lens reflex camera CAM having such a constitution, light from an object (not shown) passes through the objective lens OL, is reflected in the direction of the focus plate F by the mirror M, whereupon an object image is formed on the focus plate F. In the finder optical system VF, light beams from the object image on the focus plate F pass through the condenser lens C, the pentaprism P and the eyepiece lens EL, and are guided to the eyepoint EP, whereby an observer can observe a real image of the object (not shown) at the eyepoint EP. During shutter release, the light from the object (not shown) passing through the objective lens OL forms an image on the imaging element CCD, since the mirror M is in a mirror-up state.

EXAMPLES

Figure 1:
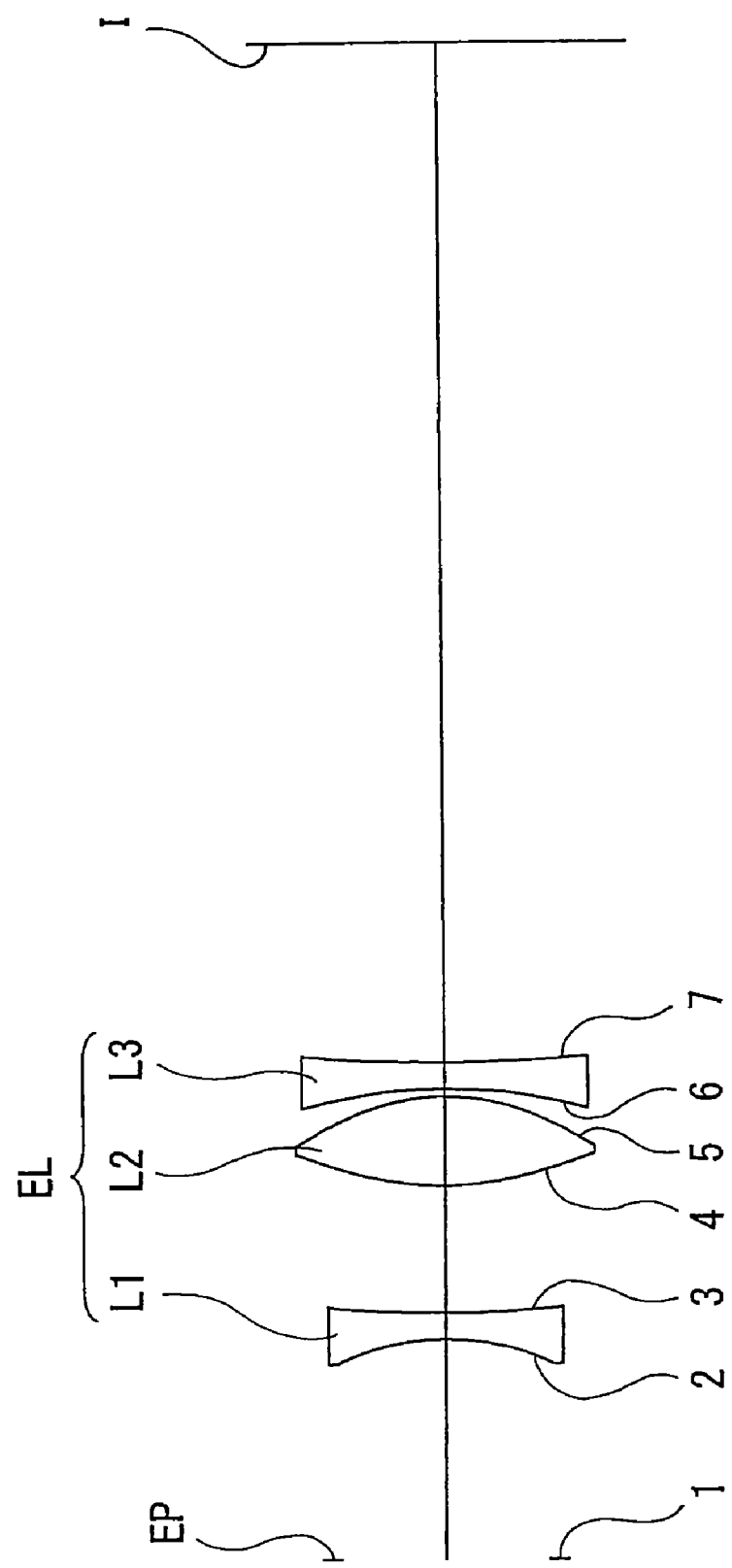
FIG. 1 is a lens configuration diagram of an eyepiece lens according to a first embodiment.
Figure 5:
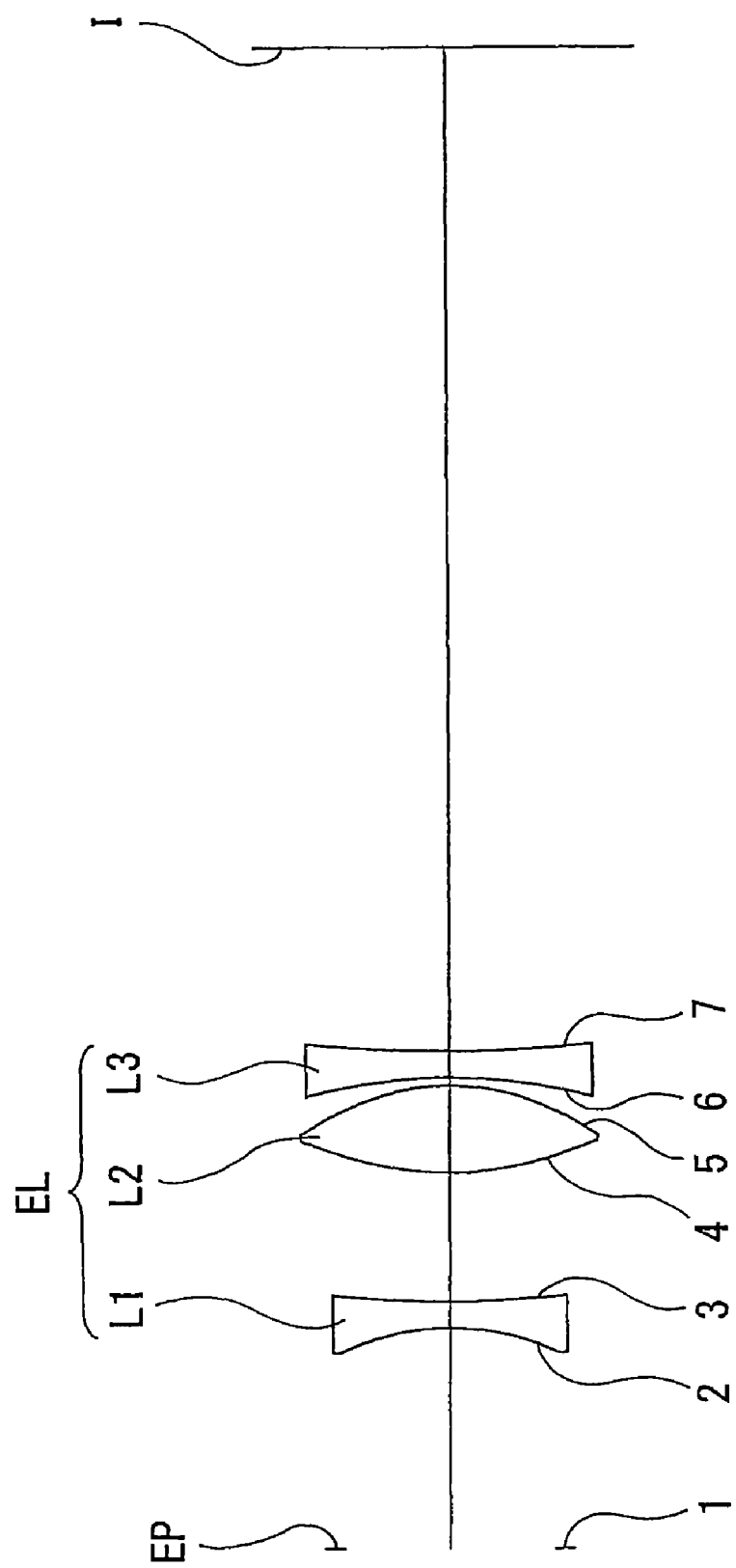
FIG. 5 is a lens configuration diagram of an eyepiece lens according to a second embodiment.
Figure 9:
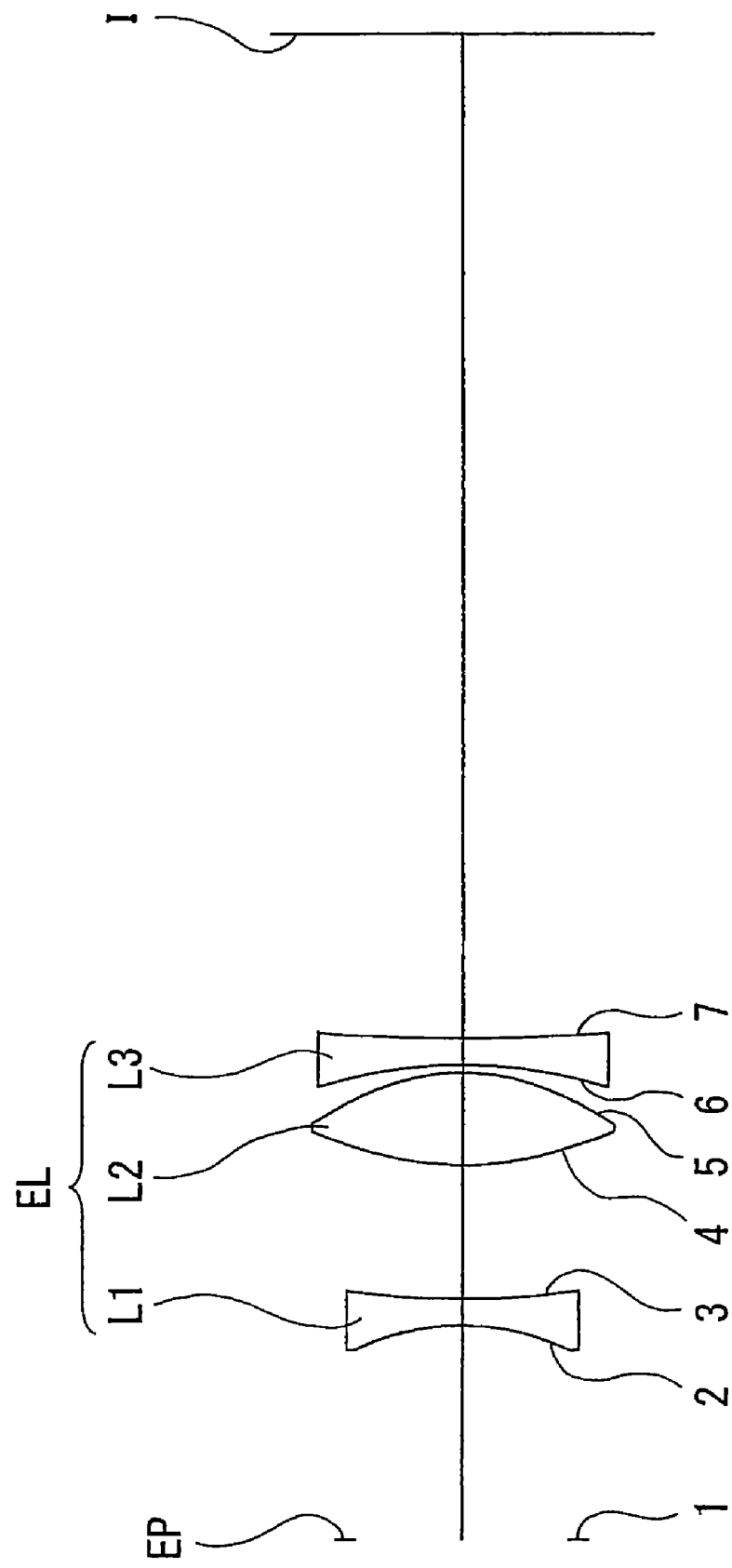
FIG. 9 is a lens configuration diagram of an eyepiece lens according to a third embodiment.

Embodiments of the invention of the present application are explained below with reference to accompanying drawings. As illustrated in FIGS. 1, 5 and 9, all the eyepiece lenses EL according to a first through third embodiments are eyepiece lenses for use in single-lens reflex cameras, comprising each, as described above, a first lens L1 being a negative lens, a second lens L2 being a positive lens, and a third lens L3 being a negative lens, along the optical axis and sequentially from the eyepoint EP side, such that a concave surface of the first lens L1 on the eyepoint EP side and the convex surfaces on both sides of the second lens L2 are aspherical surfaces.

Various data on the lenses of the eyepiece lenses EL in the first, second and third embodiments are given, respectively, in Tables 1, 2 and 3 below. In all the tables, the leftmost item denotes the number of an optical surface (hereinafter, surface number) with 1 being the surface of the eyepoint EP, R denotes the radius of curvature of each optical surface, D represents the distance on the optical axis from the respective optical surface to the next optical surface (hereinafter, surface gap), nd represents the d-line refractive index (wavelength 587.6 nm), and νd represents the d-line Abbe number. The magnification denotes finder magnification for assembly with an imaging lens having a focal distance of 51.6.

The surfaces indicated with an asterisk * in the tables are aspherical surfaces that are given by conditional equation (7).

$$x1=(y^2/r)/\{1+(1-K\times y^2/r^2)^{1/2}\}+C4\times y^4+C6\times y^6+C10\times y^{10} \quad (7)$$

wherein y is the height from the optical axis, x1 is the depth of the surface in the optical axis direction (aspherical surface sag), r is a paraxial curvature radius, K is a conic constant, and Cn are n-th order aspherical surface coefficients (n=4, 6, 8 and 10).

In the case of a spherical surface, conditional equation (7) can be expressed as conditional equation (8)

$$x2=(y^2/r)/\{1+(1-y^2/r^2)^{1/2}\} \quad (8)$$

wherein x2 is the depth of the surface in the optical axis direction (spherical surface sag).

The amount of asphericity AS, which is the difference between the spherical surface sag x1 and the spherical surface sag x2, is represented thus by conditional equation (9) below.

$$AS=(y^2/r)/\{1+(1-K\times y^2/r^2)^{1/2}\}+C4\times y^4+C6\times y^6+C8\times y^8+C10\times y^{10}-(y^2/r)/\{1+(1-y^2/r^2)^{1/2}\} \quad (9)$$

The amount of asphericity AS1 of the convex surface of the second lens L2 on the eyepoint EP side and the amount of asphericity AS2 of the convex surface of the second lens L2 on the object side can be calculated using conditional equation (9). The amount of asphericity is calculated using a height y from the optical axis y=0.3×re2, wherein re2 is a paraxial radius of curvature of a convex surface of the second lens L2 on the eyepoint EP side.

Unless otherwise specified, the units used for the focal distance f, the radius of curvature R, the surface gap d and other lengths are "mm" for all the tables below. The units, however, are not limited to "mm", and other suitable units may be used, since the same optical performance is obtained when proportionally expanding or contracting the optical system.

In the tables, the diopter units are [1/m]. For instance, a diopter X [1/m] indicates a state where the image by the eyepiece lens forms at a position along the optical axis of 1/X [m (meters)] from the eyepoint. Herein, an image formed more towards the object than the eyepoint is indicated by a negative sign.

First Example

A first embodiment of the present invention is explained next with reference to FIGS. 1 through 4 and Table 1. FIG. 1 is a lens configuration diagram of an eyepiece lens according to the first embodiment. In FIG. 1 the condenser C and the pentaprism P have been omitted, while the focus plate F is depicted only as a focus point 1 formed on the focus plate F (the same applies for FIGS. 5 and 9). In Table 1 below, which lists various data of the lenses in the first embodiment, the surface numbers 1 through 7 correspond to the surfaces 1 through 7 in FIG. 1. Lens calculations were carried out in the present embodiment using a diopter ranging from −1.6 to +0.5 [1/m], a pupil diameter of the eyepoint EP of ϕ 16 mm, an eyepoint EP position (distance from the eyepiece lens EL along the optical axis) ranging from 16.6 to 23.5 mm, and a field number of 27.0.

TABLE 1

| Surface number | R | D | νd | nd |
|---|---|---|---|---|
| 1 | ∞ | EP | | 1.000000 |
| 2* | −20.1434 | 2.0000 | 57.57 | 1.491080 |
| 3 | 86.6440 | D1 | | 1.000000 |
| 4* | 24.0409 | 6.8000 | 56.24 | 1.524700 |
| 5* | −16.7555 | D2 | | 1.000000 |
| 6 | −41.2059 | 2.0000 | 30.34 | 1.582760 |
| 7 | 109.9112 | 77.9799 | | 1.000000 |

(Aspherical surface coefficients)

| Surface number | K | C4 | C6 | C8 | C10 |
|---|---|---|---|---|---|
| 2 | 0.6234 | 0.00000 | −1.30310 × 10$^{-7}$ | 0.00000 | 0.00000 |
| 4 | −1.9588 | 0.00000 | 0.00000 | 0.00000 | 0.00000 |
| 5 | −0.3535 | 0.00000 | 5.28970 × 10$^{-10}$ | 0.00000 | 0.00000 |

TABLE 1-continued (Variable gap)

| Focal distance | 66.080 | 66.822 | 72.802 |
|---|---|---|---|
| Magnification | 0.809 | 0.791 | 0.697 |
| Diopter | −1.563 | −1.032 | 0.491 |
| EP | 16.600 | 17.900 | 23.500 |
| D1 | 9.700 | 9.000 | 5.600 |
| D2 | 0.600 | 1.300 | 4.700 |

(Condition fulfilling values)

| Conditional equation (1) | S1 = −0.623 |
|---|---|
| Conditional equation (2) | d2/Σd = 0.460 |
| Conditional equation (3) | S3 = −0.455 |
| Conditional equation (4) | AS1/AS2 = −0.666 |
| Conditional equation (5) | Rs1/Rs3 = 0.788 |
| Conditional equation (6) | f1/f3 = 0.646 |

In the present embodiment, therefore, all the above conditional equations (1) through (6) are satisfied.

Figure 2:
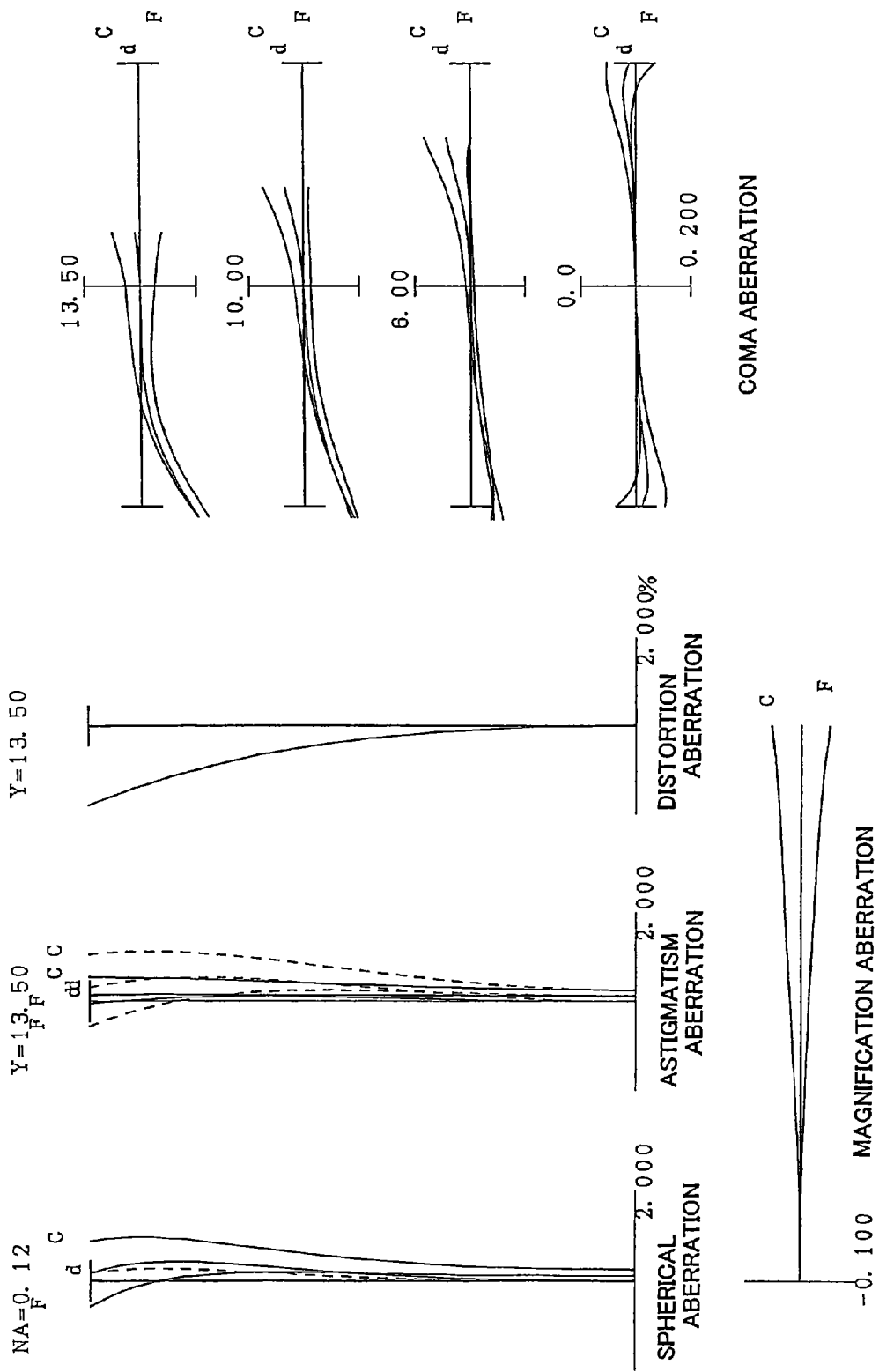
FIG. 2 is a set of aberration graphs for a diopter of −1.6 [1/m] in the first embodiment.
Figure 3:
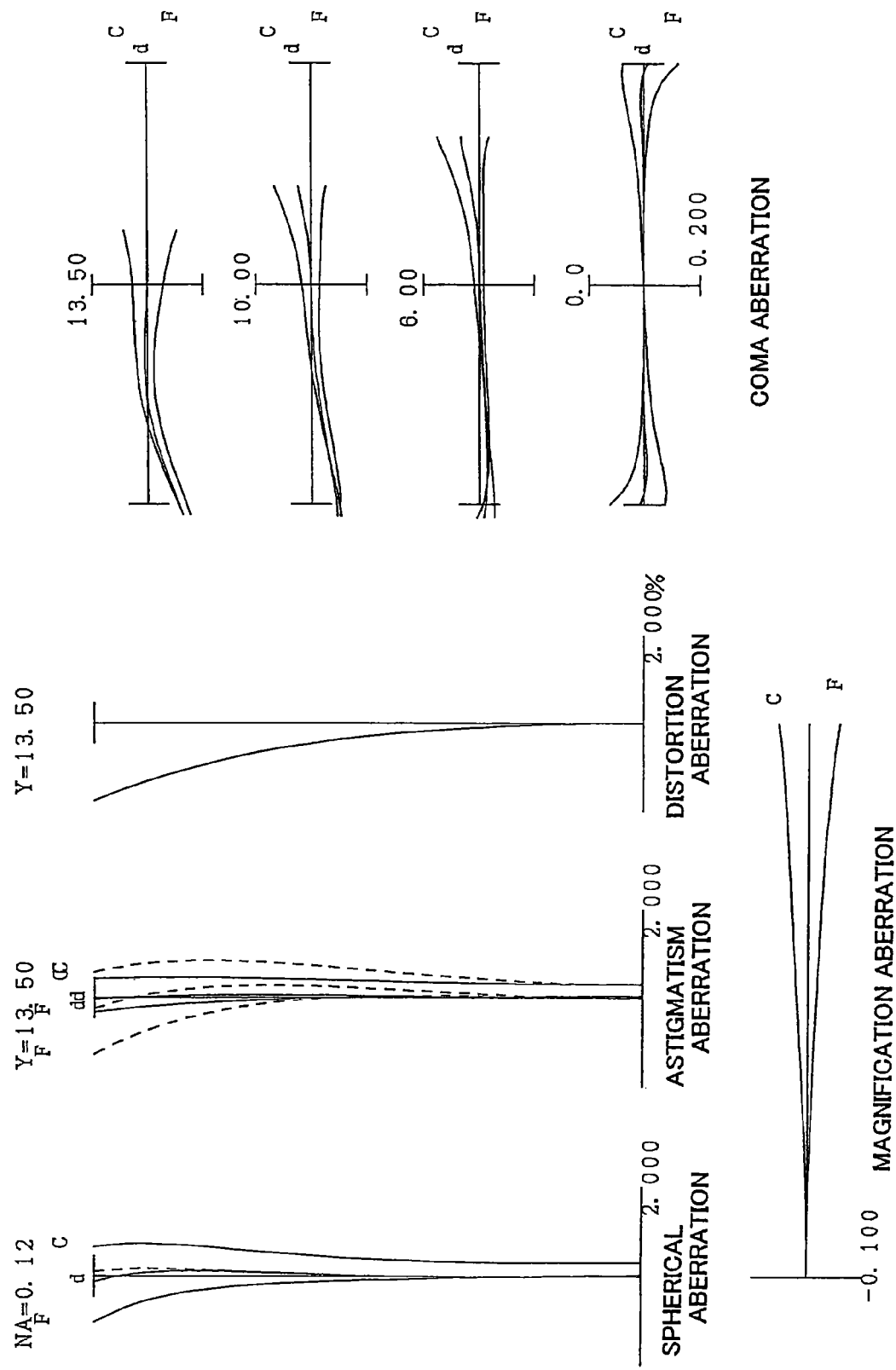
FIG. 3 is a set of aberration graphs for a diopter of −1.0 [1/m] in the first embodiment.
Figure 4:
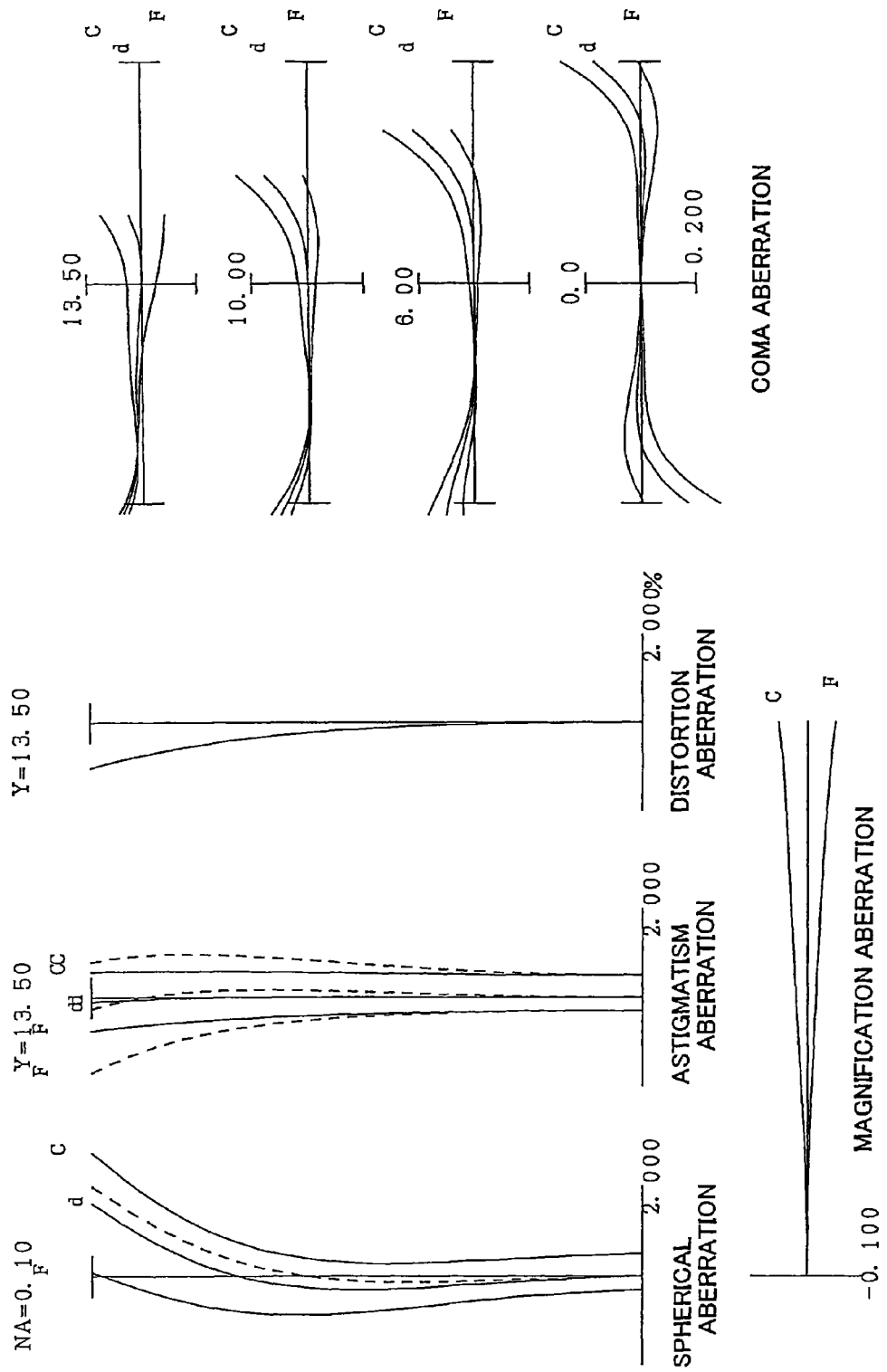
FIG. 4 is a set of aberration graphs for a diopter of +0.5 [1/m] in the first embodiment.

FIG. 2, FIG. 3 and FIG. 4 are sets of aberration graphs for diopters of −1.6 [1/m], −1.0 [1/m] and +0.5 [1/m], respectively, in the first embodiment. The results illustrated in the aberration graphs correspond to the d-line ($\lambda$=587.6 nm), the C-line ($\lambda$=656.3 nm), and the F-line ($\lambda$=486.1 nm). NA denotes the numerical aperture and Y denotes the image height. In the astigmatism graph, the solid line denotes the sagittal image field while the broken line denotes the meridional image field. The above explanation of the aberration graphs applies equally to the other examples. As the aberration graphs show, the various aberrations of the optical system are well corrected for each diopter.

The eyepiece lens EL according to the first embodiment, thus, allows achieving a high-magnification diopter-adjustable eyepiece lens, while securing long eye relief, in a single-lens reflex camera CAM using a pentaprism P or a pentam-irror. A single-lens reflex camera CAM equipped with such an eyepiece lens EL allows securing long eye relief and high observation magnification with a diopter-adjustable configuration.

In the present embodiment, the object-side surface of the first lens L1 is an aspherical surface. This affords the effect of enabling good spherical aberration correction and the effect of enabling long eye relief. Also, both surfaces of the second lens L2 are aspherical surfaces. This affords the effect of enabling good coma aberration correction across the entire diopter adjustment range. The same constitution using aspherical surfaces and the same effects are obtained in the embodiments below.

Second Example

A second embodiment of the present invention is explained next with reference to FIGS. 5 through 8 and Table 2. FIG. 5 is a lens configuration diagram of an eyepiece lens according to the second embodiment. The eyepiece lens of the second embodiment has the same constitution as the eyepiece lens of the first embodiment, and hence the various elements have been denoted with the same reference numerals as in the first embodiment.

Table 2 below lists various data of the lenses in the second embodiment. In table 2, the surface numbers 1 through 7 correspond to the surfaces 1 through 7 in FIG. 5. In Table 2, the lens surfaces having an aspherical surface shape are indicated with an asterisk * to the right of the surface number. Also, lens calculations were carried out in the present embodiment using a diopter ranging from −1.5 to +0.6 [1/m], a pupil diameter of the eyepoint EP of $\phi$ 16 mm, an eyepoint EP position (distance from the eyepiece lens EL along the optical axis) ranging from 16.5 to 23.5 mm, and a field number of 27.0.

TABLE 2

| Surface number | R | D | vd | nd |
|---|---|---|---|---|
| 1 | ∞ | EP | | 1.000000 |
| 2* | −19.7022 | 2.0000 | 57.57 | 1.491080 |
| 3 | 86.4998 | D1 | | 1.000000 |
| 4* | 23.7506 | 6.6000 | 56.24 | 1.524700 |
| 5* | −16.5685 | D2 | | 1.000000 |
| 6 | −41.3160 | 2.0000 | 30.34 | 1.582760 |
| 7 | 110.0121 | 76.0230 | | 1.000000 |

(Aspherical surface coefficients)

| Surface number | K | C4 | C6 | C8 | C10 |
|---|---|---|---|---|---|
| 2 | 0.6488 | 0.00000 | −1.25200 × 10$^{-7}$ | 0.00000 | 0.00000 |
| 4 | −1.9474 | 0.00000 | 0.00000 | 0.00000 | 0.00000 |
| 5 | −0.3620 | 0.00000 | −1.26180 × 10$^{-9}$ | 0.00000 | 0.00000 |

(Variable gap)

| Focal distance | 63.785 | 64.563 | 70.937 |
|---|---|---|---|
| Magnification | 0.835 | 0.816 | 0.714 |
| Diopter | −1.507 | −0.969 | 0.564 |
| EP | 16.500 | 18.000 | 23.500 |
| D1 | 9.700 | 9.000 | 5.500 |
| D2 | 0.600 | 1.300 | 4.800 |

(Condition fulfilling values)

| Conditional equation (1) | S1 = −0.629 |
|---|---|
| Conditional equation (2) | d2/Σd = 0.464 |
| Conditional equation (3) | S3 = −0.454 |
| Conditional equation (4) | AS1/AS2 = −0.662 |
| Conditional equation (5) | Rs1/Rs3 = 0.786 |
| Conditional equation (6) | f1/f3 = 0.633 |

In the present embodiment, therefore, all the above conditional equations (1) through (6) are satisfied.

Figure 6:
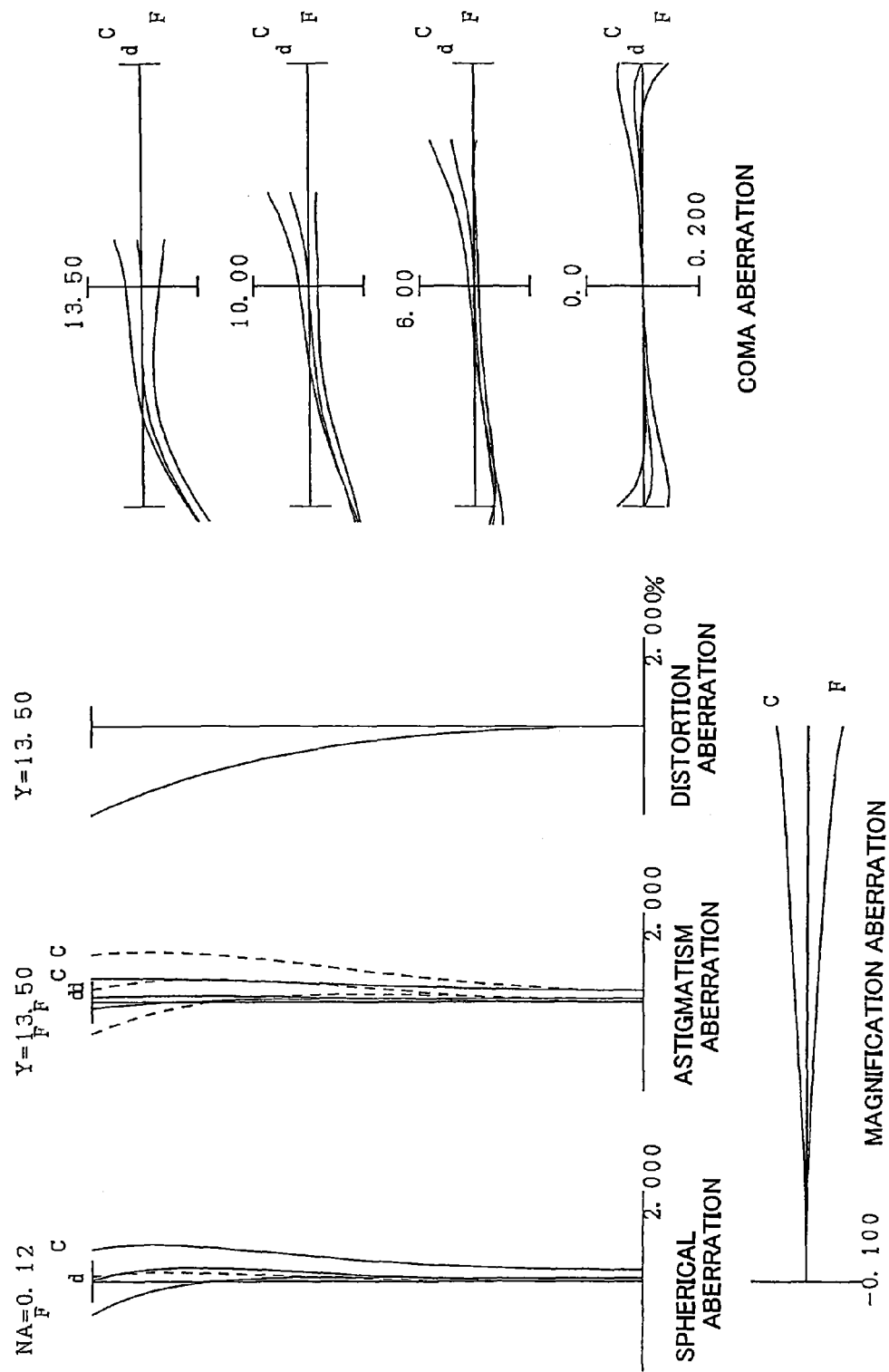
FIG. 6 is a set of aberration graphs for a diopter of −1.5 [1/m] in the second embodiment.
Figure 7:
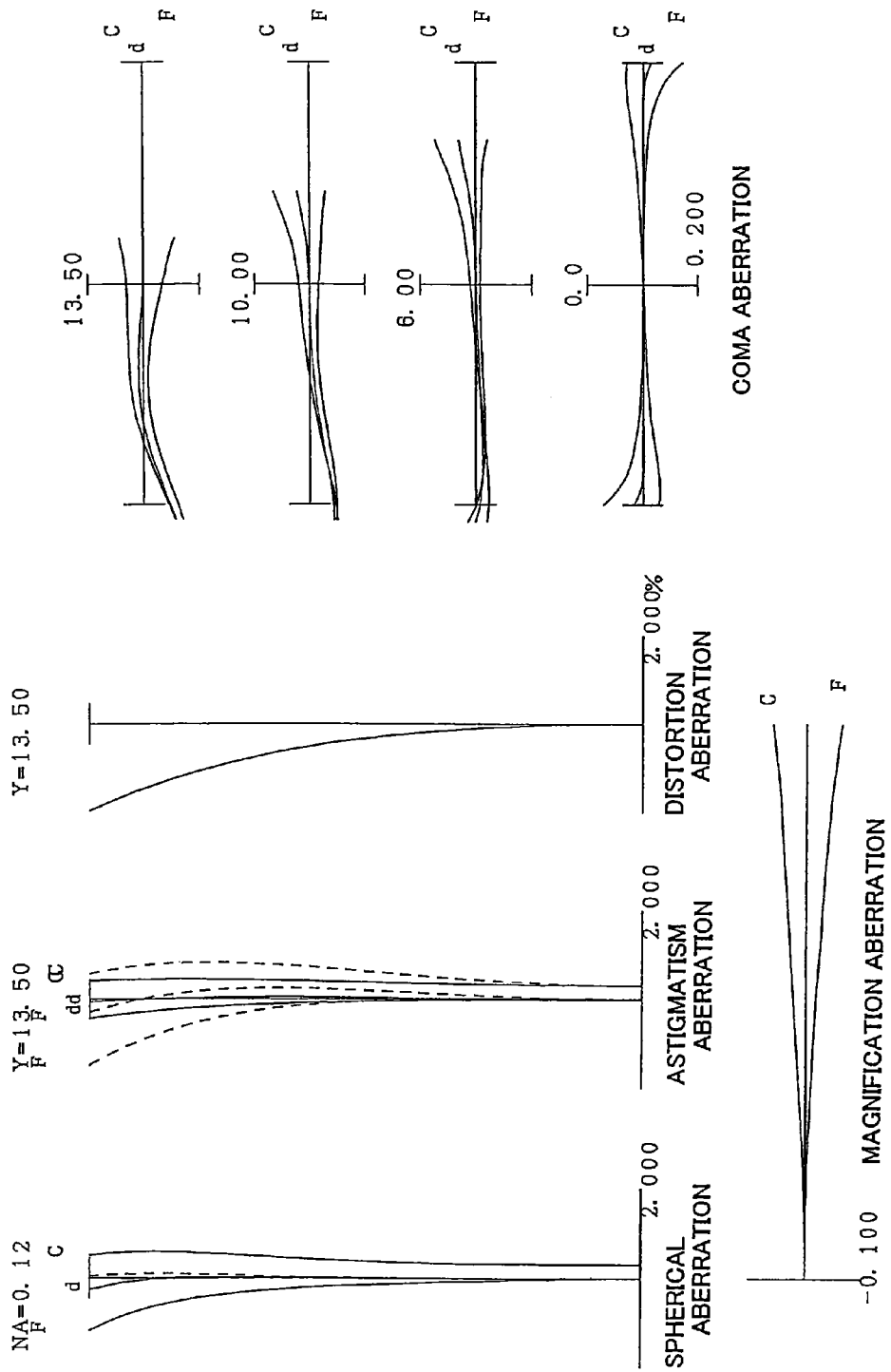
FIG. 7 is a set of aberration graphs for a diopter of −1.0 [1/m] in the second embodiment.
Figure 8:
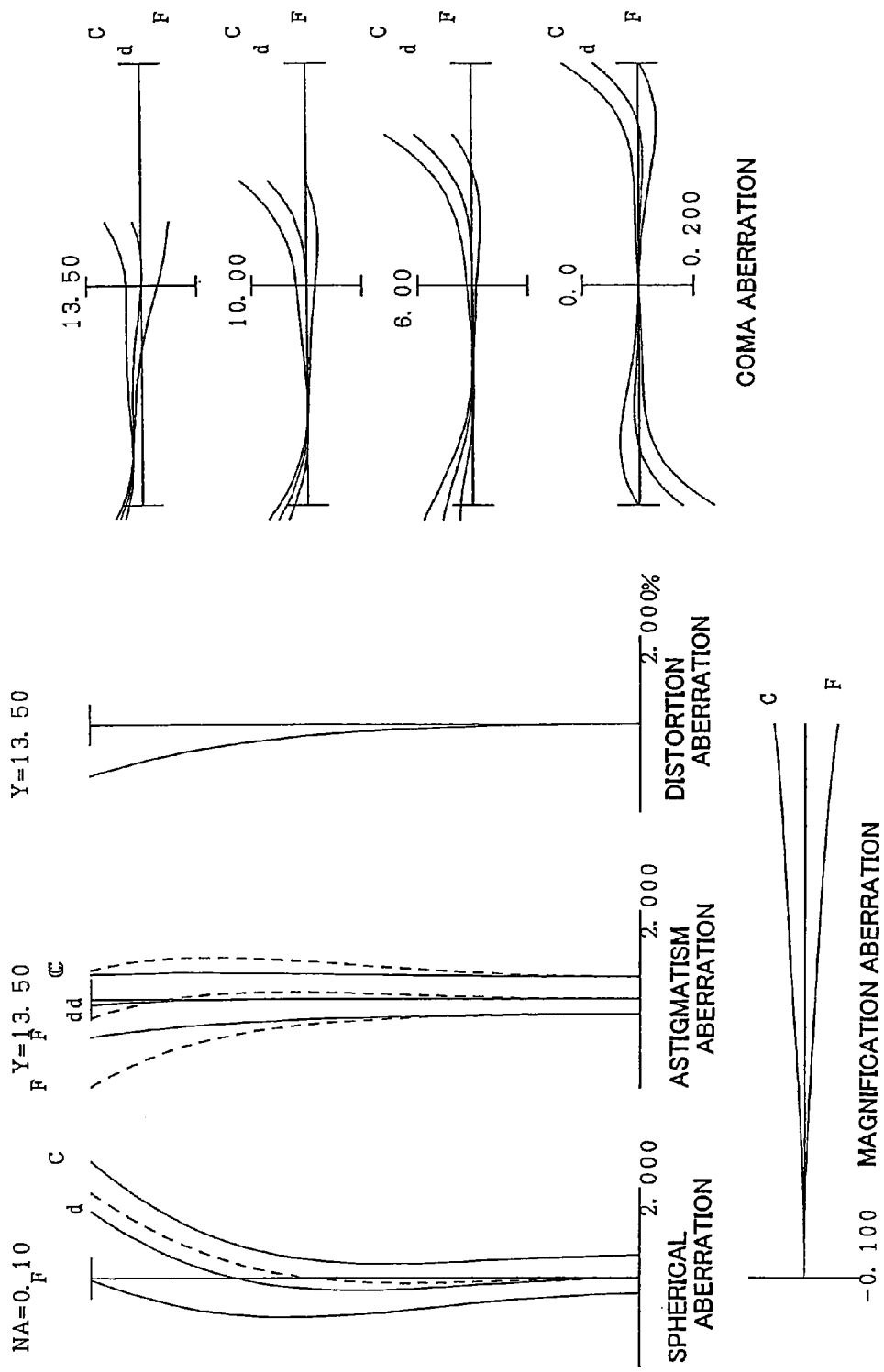
FIG. 8 is a set of aberration graphs for a diopter of +0.6 [1/m] in the second embodiment.

FIG. 6, FIG. 7 and FIG. 8 are sets of aberration graphs for diopters of −1.5 [1/m], −1.0 [1/m] and +0.6 [1/m], respectively, in the second t. As the aberration graphs show, the various aberrations of the optical system are well corrected for each diopter.

The eyepiece lens EL according to the second t, thus, affords the same effects as the first embodiment. A single-lens reflex camera CAM equipped with such an eyepiece lens EL affords also the same effects as the first embodiment.

Third Example

A third embodiment of the present invention is explained next with reference to FIGS. 9 through 12 and Table 3. FIG. 9 is a lens configuration diagram of an eyepiece lens according to the third embodiment. The eyepiece lens of the third embodiment has the same constitution as the eyepiece lens of the first embodiment, and hence the various elements have been denoted with the same reference numerals as in the first embodiment.

Table 3 below lists various data of the lenses in the third embodiment. In table 3, the surface numbers 1 through 7 correspond to the surfaces 1 through 7 in FIG. 9. In Table 3, the lens surfaces having an aspherical surface shape are indicated with an asterisk * to the right of the surface number. Also, lens calculations were carried out in the present embodiment using a diopter ranging from −1.6 to +0.4 [1/m], a pupil diameter of the eyepoint EP of $\phi$ 16 mm, an eyepoint EP position (distance from the eyepiece lens EL along the optical axis) ranging from 16.0 to 23.0 mm, and a field number of 27.0.

TABLE 3

| Surface number | R | D | vd | nd |
|---|---|---|---|---|
| 1 | ∞ | EP | | 1.000000 |
| 2* | −18.6648 | 2.0000 | 57.57 | 1.491080 |
| 3 | 61.4307 | D1 | | 1.000000 |
| 4* | 22.6177 | 7.0000 | 56.24 | 1.524700 |
| 5* | −15.6891 | D2 | | 1.000000 |
| 6 | −36.1538 | 2.0000 | 30.34 | 1.582760 |
| 7 | 136.7610 | 76.0000 | | 1.000000 |

(Aspherical surface coefficients)

| Surface number | K | C4 | C6 | C8 | C10 |
|---|---|---|---|---|---|
| 2 | 0.6275 | 0.00000 | $-1.68410 \times 10^{-7}$ | 0.00000 | 0.00000 |
| 4 | −1.8908 | 0.00000 | 0.00000 | 0.00000 | 0.00000 |
| 5 | −0.3162 | 0.00000 | $4.11650 \times 10^{-9}$ | 0.00000 | 0.00000 |

(Variable gap)

| Focal distance | 60.863 | 61.804 | 70.188 |
|---|---|---|---|
| Magnification | 0.871 | 0.851 | 0.727 |
| Diopter | −1.566 | −1.012 | 0.384 |
| EP | 16.000 | 17.500 | 23.000 |
| D1 | 10.100 | 9.400 | 5.700 |
| D2 | 0.600 | 1.300 | 5.000 |

(Condition fulfilling values)

| Conditional equation (1) | S1 = −0.534 |
|---|---|
| Conditional equation (2) | d2/Σd = 0.465 |
| Conditional equation (3) | S3 = −0.582 |
| Conditional equation (4) | AS1/AS2 = −0.657 |
| Conditional equation (5) | Rs1/Rs3 = 0.449 |
| Conditional equation (6) | f1/f3 = 0.592 |

In the present embodiment, therefore, all the above conditional equations (1) through (6) are satisfied.

Figure 10:
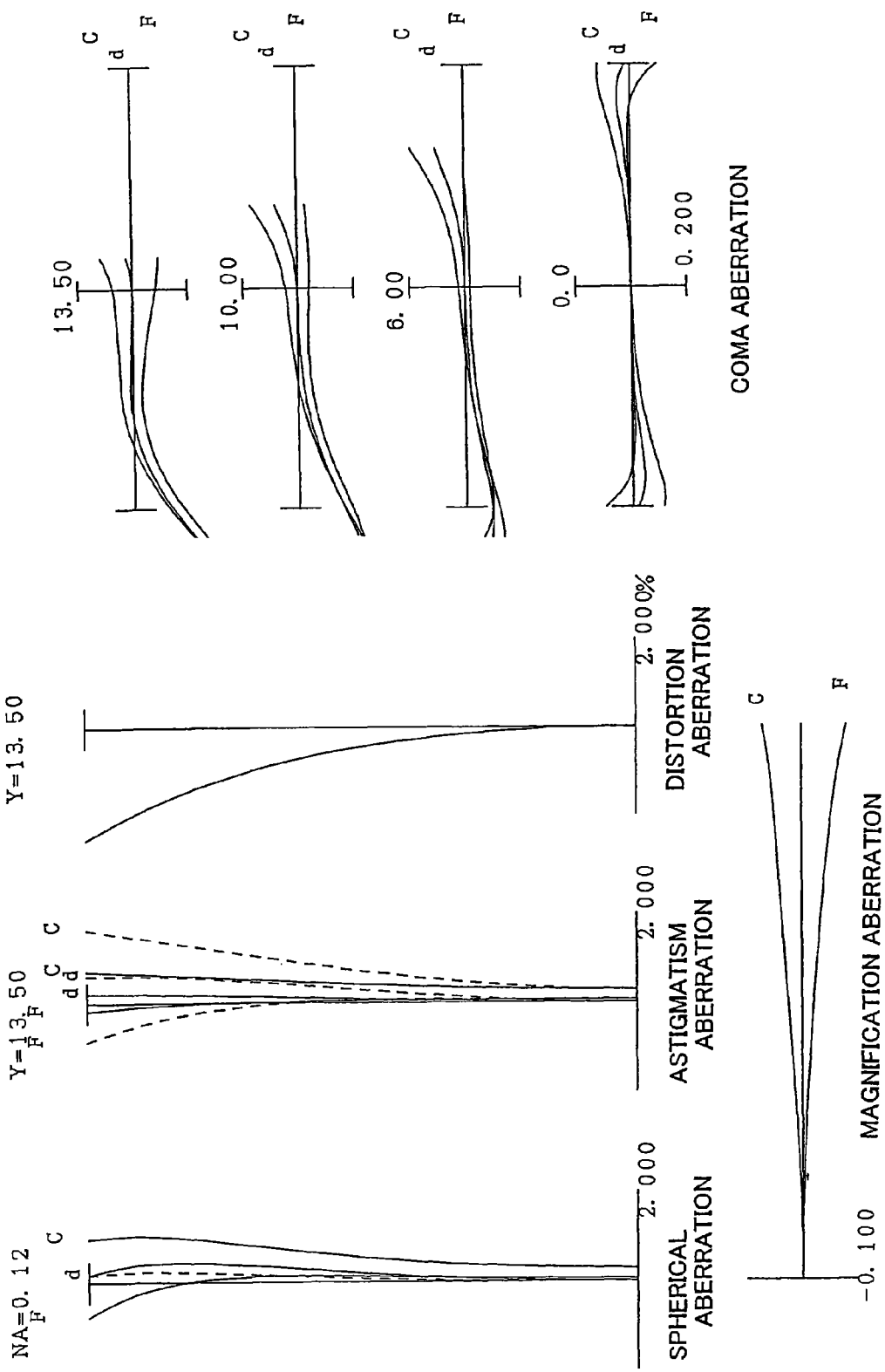
FIG. 10 is a set of aberration graphs for a diopter of −1.6 [1/m] in the third embodiment.
Figure 11:
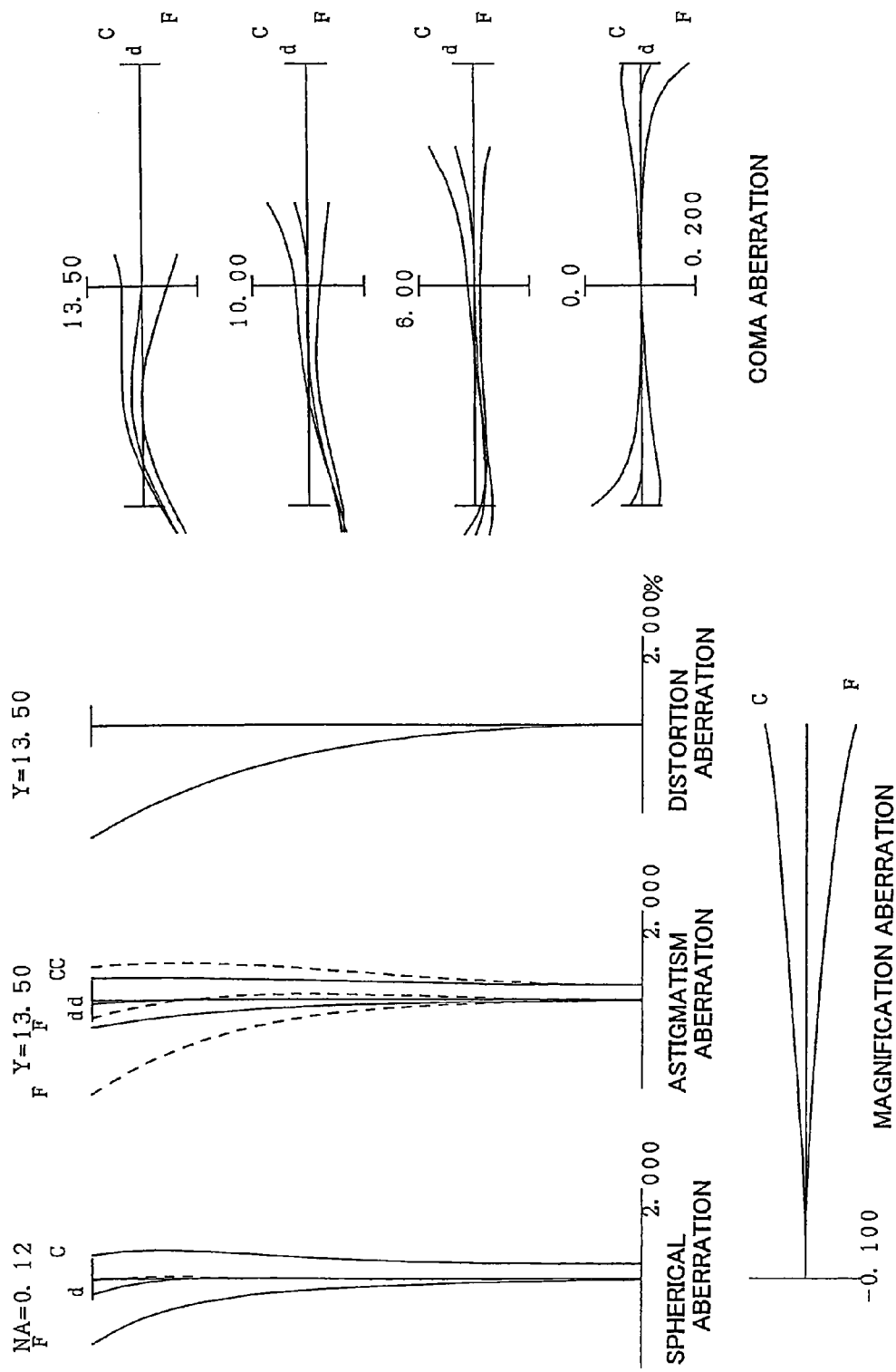
FIG. 11 is a set of aberration graphs for a diopter of −1.0 [1/m] in the third embodiment.
Figure 12:
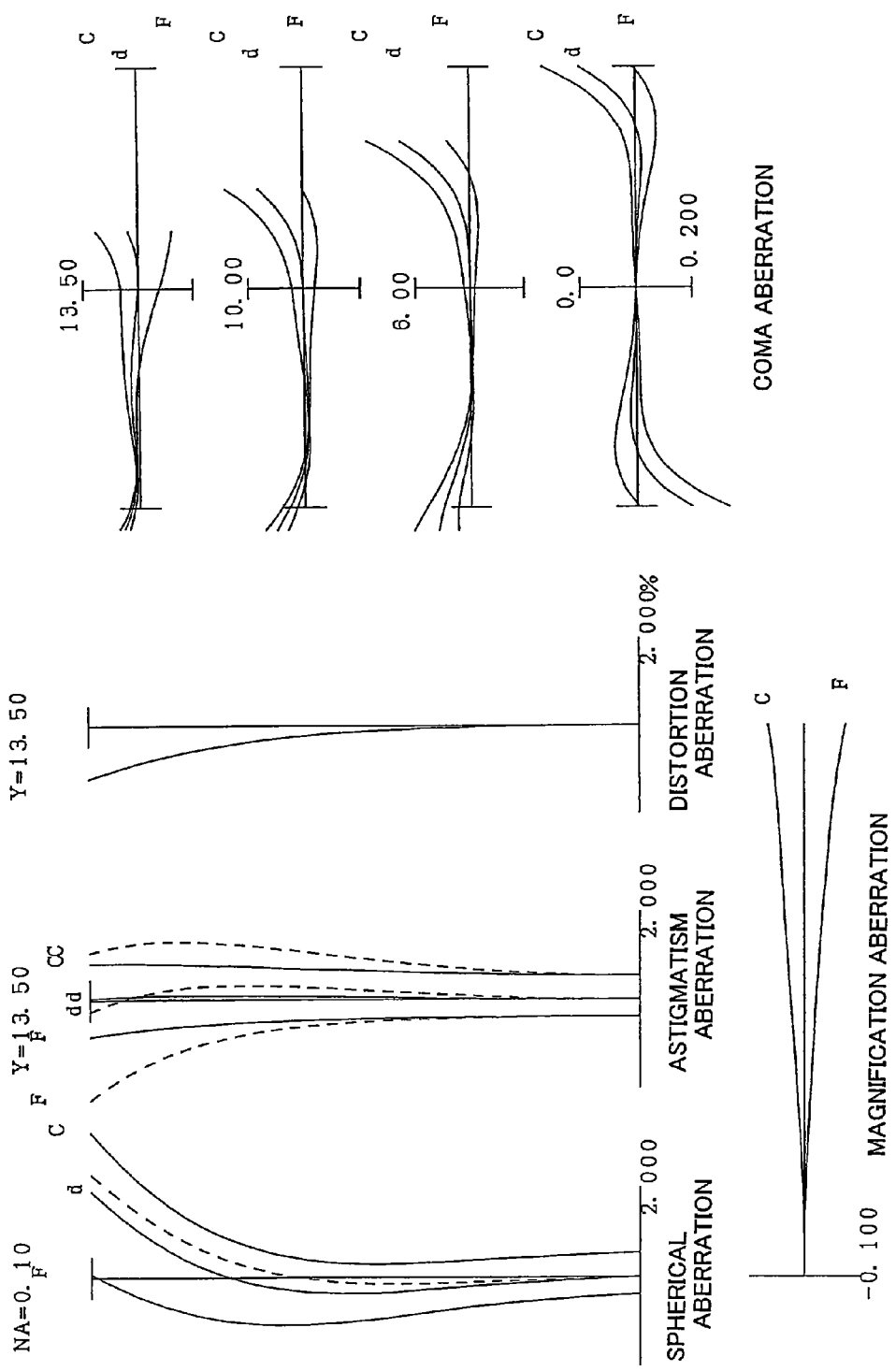
FIG. 12 is a set of aberration graphs for a diopter of +0.4 [1/m] in the third embodiment.

FIG. 10, FIG. 11 and FIG. 12 are sets of aberration graphs for diopters of −1.6 [1/m], −1.0 [1/m] and +0.4 [1/m], respectively, in the third embodiment. As the aberration graphs show, the various aberrations of the optical system are well corrected for each diopter.

The eyepiece lens EL according to the third embodiment, thus, affords the same effects as the first embodiment. A single-lens reflex camera CAM equipped with such an eyepiece lens EL affords also the same effects as the first embodiment.

The eyepiece lens according to the present embodiment is not limited to an eyepiece lens used in a single-lens reflex camera, and may be widely used also as an eyepiece lens in a finder of a real-image optical system. The above embodiments, which are merely illustrative in nature, are not limited to the above-described constitutions and/or shapes, and may incorporate suitable alterations and modifications without departing from the scope of the present invention.

In the above embodiments, diopter adjustment can be carried out by moving the second lens L2 along the optical axis, but diopter adjustment is not limited thereto. Diopter can be adjusted also by moving the first lens L1, by moving both the first lens L1 and the second lens L2, or by moving at least one lens among the first lens L1, the second lens L2 and the third lens L3, along the optical axis.

Easier processing and lighter weight can also be achieved if at least one among the first lens L1, the second lens L2 and the third lens L3 is a plastic lens. From the viewpoint of processability, lenses having aspherical surfaces are preferably plastic lenses, since the latter can be manufactured by injection molding. Obviously, using plastic lenses for all the lenses is yet more preferable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An eyepiece lens for observing an image formed by an objective lens via an erecting optical system,
consisting of a first lens being a negative lens, a second lens being a positive lens, and a third lens being a negative lens, which are arranged in this order from an eyepoint side along the optical axis, in such a way that diopter adjustment can be carried out by moving at least one among the first lens, the second lens and the third lens along the optical axis,
the first lens and the third lens having a biconcave shape, and
a concave surface of the third lens on the eyepoint side having a curvature greater than that of a concave surface of the third lens on the object side; satisfying:

$$0.5 < f1/f3 < 0.8$$

wherein, f1 is a focal distance of the first lens and f3 is a focal distance of the third lens.

2. The eyepiece lens as claimed in claim 1, satisfying a condition:

$$0.4 < d2/\Sigma d < 0.6$$

wherein, d2 is an air gap along the optical axis between the first lens and the second lens when the diopter adjustment is carried out so that diopter becomes maximum on the negative side, and Σd is an air gap along the optical axis between a concave surface of the first lens on the eyepoint side and a concave surface of the third lens on the object side when the diopter adjustment is carried out so that diopter becomes maximum on the negative side.

3. The eyepiece lens as claimed in claim 1, wherein a concave surface of the first lens on the eyepoint side has a greater curvature than a concave surface of the first lens on the object side.

4. The eyepiece lens as claimed in claim 1, satisfying a condition:

$$-0.9 < S1 < -0.3$$

wherein, S1 is a shape factor of the first lens and is defined by a conditional equation S1=(Re1+Rs1)/(Re1−Rs1) in which Re1 is the radius of curvature of a concave surface of the first lens on the eyepoint side and Rs1 is the radius of curvature of a concave surface of the first lens on the object side.

5. The eyepiece lens as claimed in claim 1, satisfying the condition:

$$-0.8 < S3 < -0.2$$

wherein, S3 is a shape factor of the third lens and is defined by a conditional equation S3=(Re3+Rs3)/(Re3−Rs3) in which Re3 is the radius of curvature of a concave surface of the third lens on the eyepoint side and Rs3 is the radius of curvature of a concave surface of the third lens on the object side.

6. The eyepiece lens as claimed in claim 1, wherein a lens surface of the second lens on the eyepoint side and a lens surface of the second lens on the image side are aspherical surfaces.

7. The eyepiece lens as claimed in claim 1, wherein
a convex surface of the second lens on the eyepoint side and a convex surface of the second lens on the image side are configured as aspherical surfaces having positive refractive power that decreases away from the optical axis,
the eyepiece lens satisfying a condition:

$$-1.0 < AS1/AS2 < -0.2$$

wherein, AS1 is the amount of asphericity of a convex surface of the second lens on the eyepoint side and AS2 is the amount of asphericity of a convex surface of the second lens on the object side, and the height from the optical axis is y=0.3×re2, where re2 is a paraxial radius of curvature of a convex surface of the second lens on the eyepoint side,
the amount of asphericity AS of both convex surfaces of the second lens being given by a conditional equation $$AS = (y^2/r)/\{1+(1-Kxy^2/r^2)^{1/2}\} + C4 \times y^4 + C6 \times y^6 + C8 \times y^8 + C10 \times y^{10} - (y^2/r)/\{1+(1-y^2/r^2)^{1/2}\}$$

in which y is a height from the optical axis, r is a paraxial curvature radius, K is a conic constant, C4 is a fourth-order aspherical surface coefficient, C6 is a sixth-order aspherical surface coefficient, C8 is a eighth-order aspherical surface coefficient, and C10 is a tenth-order aspherical surface coefficient.

8. The eyepiece lens as claimed in claim 1, wherein the first lens is a lens having an aspherical surface.

9. The eyepiece lens as claimed in claim 1, wherein diopter adjustment can be carried out by moving the second lens, among the first lens, the second lens and the third lens, along the optical axis.

10. The eyepiece lens as claimed in claim 1, satisfying:

$$0.3 < Rs1/Rs3 < 1.0$$

wherein, Rs1 is the radius of curvature of a concave surface of the first lens on the object side, and Rs3 is the radius of curvature of a concave surface of the third lens on the object side.

11. The eyepiece lens as claimed in claim 1, wherein the erecting optical system comprises a mirror.

12. The eyepiece lens as claimed in claim 1, wherein the erecting optical system comprises a pentamirror.

13. The eyepiece lens as claimed in claim 1, wherein at least one among the first lens, the second lens and the third lens is a plastic lens.

14. The eyepiece lens as claimed in claim 1, wherein the first lens, the second lens and the third lens are plastic lenses.

15. An optical instrument, comprising:
an objective lens for forming an image of an object on a predetermined surface; and
an eyepiece lens for observing an image formed by the objective lens via an erecting optical system,
the eyepiece lens consisting of a first lens being a negative lens, a second lens being a positive lens, and a third lens being a negative lens, which are arranged in this order from an eyepoint side along the optical axis, in such a way that diopter adjustment can be carried out by moving at least one among the first lens, the second lens and the third lens along the optical axis,
the first lens and the third lens having a biconcave shape, and
a concave surface of the third lens on the eyepoint side having a curvature greater than that of a concave surface of the third lens on the object side; satisfying:

$$0.5 < f1/f3 < 0.8$$

wherein, f1 is a focal distance of the first lens and f3 is a focal distance of the third lens.

16. A diopter adjustment method for an eyepiece lens for observing an image formed by an objective lens via an erecting optical system,
the eyepiece lens consisting of a first lens being a negative lens, a second lens being a positive lens, and a third lens being a negative lens, which are arranged in this order from an eyepoint side along an optical axis,
the first lens and the third lens having a biconcave shape, and
a concave surface of the third lens on the eyepoint side having a curvature greater than that of a concave surface of the third lens on the object side, wherein
the diopter adjustment method comprises a step of carrying out diopter adjustment by moving at least one among the first lens, the second lens and the third lens along the optical axis; satisfying:

$$0.5 < f1/f3 < 0.8$$

wherein, f1 is a focal distance of the first lens and f3 is a focal distance of the third lens.

17. The diopter adjustment method for an eyepiece lens as claimed in claim 16, the eyepiece lens further satisfying a condition:

$$0.4 < d2/\Sigma d < 0.6$$

wherein, d2 is an air gap along an optical axis between the first and the second lens when the diopter adjustment is carried out so that diopter becomes maximum on the negative side, and Σd is an air gap along an optical axis between a concave surface of the first lens on the eyepoint side and a concave surface of the third lens on the object side when diopter adjustment is carried out so that diopter becomes maximum on the negative side.

18. The diopter adjustment method for an eyepiece lens as claimed in claim 17, wherein a concave surface of the first lens on the eyepoint side has a greater curvature than a concave surface of the first lens on the object side.

19. The diopter adjustment method for an eyepiece lens as claimed in claim 17, the eyepiece lens further satisfying a condition:

$$-0.9 < S1 < -0.3$$

wherein, S1 is a shape factor of the first lens and is defined by a conditional equation S1=(Re1+Rs1)/(Re1−Rs1) in which Re1 is the radius of curvature of a concave surface of the first lens on the eyepoint side and Rs1 is the radius of curvature of a concave surface of the first lens on the object side.

20. The diopter adjustment method for an eyepiece lens as claimed in claim 16, wherein the second lens comprises a both-sides aspherical surface lens.

21. An eyepiece lens for observing all image formed by an objective lens via an erecting optical system,
consisting of a first lens being a negative lens, a second lens being a positive lens, and a third lens being a negative lens, which are arranged in this order from an eyepoint side along the optical axis, in such a way that diopter adjustment can be carried out by moving at least one among the first lens, the second lens and the third lens along the optical axis, the first lens and the third lens having a biconcave shape, and a concave surface of the third lens on the eyepoint side having a curvature greater than that of a concave surface of the third lens on the object side; satisfying:

$$0.3 < Rs1/Rs3 < 1.0$$

wherein, Rs1 is the radius of curvature of a concave surface of the first lens on the object side, and Rs3 is the radius of curvature of a concave surface of the third lens on the object side.

22. An eyepiece lens for observing an image formed by an objective lens via an erecting optical system,
consisting of a first lens being a negative lens, a second lens being a positive lens, and a third lens being a negative lens, which are arranged in this order from an eyepoint side along the optical axis, in such a way that diopter adjustment can be carried out by moving at least one among the first lens, the second lens and the third lens along the optical axis,
the first lens and the third lens having a biconcave shape, and
a concave surface of the third lens on the eyepoint side having a curvature greater than that of a concave surface of the third lens on the object side,
wherein a convex surface of the second lens on the eyepoint side and a convex surface of the second lens on the image side are configured as aspherical surfaces having positive refractive power that decreases away from the optical axis,
the eyepiece lens satisfying a condition:

$$-1.0 < AS1/AS2 < -0.2$$

wherein, AS1 is the amount of asphericity of a convex surface of the second lens on the eyepoint side and AS2 is the amount of asphericity of a convex surface of the second lens on the object side, and the height from the optical axis is y=0.3×re2, where re2 is a paraxial radius of curvature of a convex surface of the second lens on the eyepoint side,
the amount of asphericity AS of both convex surfaces of the second lens being given by a conditional equation $$AS=(y^2/r)/\{1+(1-Ky^2/r^2)^{1/2}\}+C4 \times y^4+C6 \times y^6+C8 \times y^8+C10 \times y^{10}-(y^2/r)/\{1+(1-y^2/r^2)^{1/2}\}$$

in which y is a height from the optical axis, r is a paraxial curvature radius, K is a conic constant, C4 is a fourth-order aspherical surface coefficient, C6 is a sixth-order aspherical surface coefficient, C8 is an eighth-order aspherical surface coefficient, and C10 is a tenth-order aspherical surface coefficient.

23. A diopter adjustment method for an eyepiece lens for observing an image formed by an objective lens via an erecting optical system, the eyepiece lens consisting of a first lens being a negative lens, a second lens being a positive lens, and a third lens being a negative lens, which are arranged in this order from an eyepoint side along an optical axis,
the first lens and the third lens having a biconcave shape, and
a concave surface of the third lens on the eyepoint side having a curvature greater than that of a concave surface of the third lens on the object side, wherein
the diopter adjustment method comprises a step of carrying out diopter adjustment by moving at least one among the first lens, the second lens and the third lens along the optical axis; and satisfying:

$$0.3 < Rs1/Rs3 < 1.0$$

wherein, Rs1 is the radius of curvature of a concave surface of the first lens on the object side, and Rs3 is the radius of curvature of a concave surface of the third lens on the object side.

24. A diopter adjustment method for an eyepiece lens for observing an image formed by an objective lens via an erecting optical system, the eyepiece lens consisting of a first lens being a negative lens, a second lens being a positive lens, and a third lens being a negative lens, which are arranged in this order from an eyepoint side along an optical axis,
the first lens and the third lens having a biconcave shape, and
a concave surface of the third lens on the eyepoint side having a curvature greater than that of a concave surface of the third lens on the object side, wherein
the diopter adjustment method comprises a step of carrying out diopter adjustment by moving at least one among the first lens, the second lens and the third lens along the optical axis,
wherein a convex surface of the second lens on the eyepoint side and a convex surface of the second lens on the image side are configured as aspherical surfaces having positive refractive power that decreases away from the optical axis,
the eyepiece lens satisfying a condition:

$$-1.0 < AS1/AS2 < -0.2$$

wherein, AS1 is the amount of asphericity of a convex surface of the second lens on the eyepoint side and AS2 is the amount of asphericity of a convex surface of the second lens on the object side, and the height from the optical axis is y=0.3×re2, where re2 is a paraxial radius of curvature of a convex surface of the second lens on the eyepoint side,
the amount of asphericity AS of both convex surfaces of the second lens being given by a conditional equation $$AS=(y^2/r)/\{1+(1-Ky^2/r^2)^{1/2}\}+C4 \times y^4+C6 \times y^6+C8 \times y^8+C10 \times y^{10}-(y^2/r)/\{1+(1-y^2/r^2)^{1/2}\}$$

in which y is a height from the optical axis, r is a paraxial curvature radius, K is a conic constant, C4 is a fourth-order aspherical surface coefficient, C6 is a sixth-order aspherical surface coefficient, C8 is an eighth-order aspherical surface coefficient, and C10 is a tenth-order aspherical surface coefficient.

* * * * *